United States Patent [19]

Barton

[11] Patent Number: 5,050,156
[45] Date of Patent: Sep. 17, 1991

[54] METHOD AND APPARATUS FOR CALIBRATING THE WRITING POWER APPLIED TO AN OPTICAL MEDIA

[75] Inventor: Mark A. Barton, Rochester, N.Y.

[73] Assignee: Eastman Kodak Company, Rochester, N.Y.

[21] Appl. No.: 426,268

[22] Filed: Oct. 25, 1989

[51] Int. Cl.[5] .............................................. G11B 7/00
[52] U.S. Cl. .................................. 369/116; 369/54; 346/76 L
[58] Field of Search ................... 369/53–58, 369/116, 124; 346/76 L, 135.1; 358/342

[56] References Cited

U.S. PATENT DOCUMENTS 4,426,693  1/1984  Satoh et al. ........................ 369/116
4,516,235  5/1985  Tarzaiski ............................ 369/116
4,631,713 12/1986  Romeas et al. ................. 369/116 X

*Primary Examiner*—Robert L. Richardson
*Attorney, Agent, or Firm*—Edward Dugas

[57] ABSTRACT

The present invention automatically performs a series of measurements on an optical media based on writing a power ramp signal of known power levels (amplitudes) on a target sector of the optical media. The amplitudes ofo the written power levels are measured. A comparison of the measured amplitude of each level of the recorded power ramp signal against reference amplitudes is made to establish a matching factor. The power level having the closest matching factor is selected as the power level to be used for the best recording of data onto the optical media. The procedure may be iterated a number of times to form an average that can then be used as the write power level. The present method also provides a pre-emphasis calibration by writing a pre-emphasis ramp in a target sector which is compared against a desired duty cycle to select the pre-emphasis which yields the desired duty cycle.

10 Claims, 5 Drawing Sheets

METHOD AND APPARATUS FOR CALIBRATING THE WRITING POWER APPLIED TO AN OPTICAL MEDIA

TECHNICAL FIELD OF THE INVENTION

The present invention is related to the field of laser writing on an optical media and more particularly, to a method and an associated apparatus for automatically performing a series of measurements on the optical media and for selecting the optimum recording parameters based on the results.

BACKGROUND OF THE INVENTION

Recording on optical media is achieved by modulating a laser spot, focused on the active layer of the media, with a time function. Typically the time function is digital, generated by a data encoder, and the laser is pulsed from a relatively low read power to a higher level write power. The desired effect is that the media is "marked" where the laser was pulsed and blank elsewhere. The physical marking mechanism of the media is generally a function of temperature. The temperature, in turn, is a function of laser light intensity, and exposure time. The laser spot has a finite size, and an approximately gaussian shape. The exposure time is dependant upon media velocity and the modulating time function. It is possible to show that the energy distribution on the media surface is the convolution integral of the modulating time function and the laser spot. An adiabatic thresholding media is "marked" where this energy distribution exceeds the threshold, and unchanged elsewhere. Due to the finite spot size and the effects of the convolution process, the region on the media surface which exceeds the threshold (and is marked) is not only dependent on the modulating time function, but also on the shape and amplitude (or write power) of the laser spot. On read-back, the marked and unmarked regions of the media are detected in the intensity of the reflected laser light, which is directed to a photodiode by the optics. The output of such a device is an analog signal, from which the desired digital waveform must be reconstructed. The circuitry, which performs the recovery of the digital waveforms, usually includes some form of amplitude threshold qualification to eliminate spurious transitions due to noise in the signal. This thresholding requires that the analog read-back signal has a fairly constant amplitude. The amplitude of the analog read-back signal is dependant upon a long list of things, including the mark length, width, and on some media, depth. All of which are dependant upon the write power which was used to record the marks in the first place.

Generally, the modulating time function is the output of a digital data encoder. As such, it conforms to very specific timing rules. The write/read process may deterministically distort this type of signal to some degree. Frequently, the original digital encoder output is subjected to some pre-compensation, or deliberate distortion prior to recording, such that upon read-back, the write/read process distortions are partially cancelled, and a better likeness of the original ideal time function is recovered. One simple pre-compensation technique, referred to herein as pre-emphasis, is the delaying of all falling edges of the digital waveform by a constant time. The result is that all write pulses are lengthened and all spaces are shortened.

SUMMARY OF THE INVENTION

The present invention provides an optical disk recorder with the means to select the correct write laser power, and pre-emphasis time delay. This is in order to achieve the optimum read signal amplitude, and the optimum mark lengths.

The write calibration system is comprised of hardware and software components.

The hardware provides the ability to adjust write power and pre-emphasis. It provides the ability to measure the read-back signal amplitude, and the duty cycle of the recovered digital waveform. It also provides the ability to sequence these adjustments and measurements at the correct times during the write calibration process.

The software initiates and organizes the entire process, interprets the results, and saves the selected operating parameters for future use.

Each data sector is subdivided into "mini-sectors". The calibration procedures utilize an experimental approach; writing with a range of parameters and measuring the results. The subdivision of sectors defines the boundaries for each experimental data point.

Several target sectors must be selected for the calibration. This is done by moving to a randomly selected place in a pre-allocated write calibration area and following the spiral track, until an empty location is found.

Amplitude Calibration: On the first pass, the amplitude of a pre-format is measured in the target sector. This is done for later comparison with drive written data. The pre-format is a writing placed on the disk by the manufacturer at a power level that provides an optimum amplitude read-back signal.

On the second pass, a specific data pattern (selected to provide optimal sensitivity of amplitude to power) is written in the sector with a different write power in each mini-sector. This write power ramp is output automatically by the hardware as the sector is passed over.

On the third pass, the amplitude of the drive written data is measured in each mini-sector. The power used to write the mini-sector, which has the amplitude that best matches the pre-format amplitude (measured on the first pass) is selected as optimum. This sequence is repeated and the results may be averaged to give sufficient accuracy.

Pre-emphasis Calibration: A very similar sequence is performed to optimized pre-emphasis. On the first pass, a specific data pattern (again consisting of all medium length marks/spaces) is written in the sector with a different pre-emphasis in each mini-sector. This pre-emphasis ramp is outputted automatically by the hardware as the sector is passed over.

On the second pass, the duty cycle of the drive written data is measured in each mini-sector. The pre-emphasis used to write the mini-sector, which has the minimum duty cycle error, is selected as optimum. This sequence is also repeated and the results may be averaged to give sufficient accuracy.

The results of both calibrations may be saved in computer memory (RAM) for later use. The entire write calibration process is initiated by drive software when the memory does not contain a record for the current disk, or the record is date stamped as too old to be considered valid.

From the foregoing, it can be seen that it is a primary object of the present invention to provide an improved method and apparatus for recording on an optical media.

It is another object of the present invention to provide an improved method and an apparatus for automatically performing a series of measurements on an optical media that are used to select optimum recording parameters.

A further object of the present invention is to provide a system for providing duty cycle measurements in an optical media system.

These and other objects of the present invention will become more apparent when taken in conjunction with the following description and drawings, wherein like characters indicate like parts and which drawings form a part of the present application.

DESCRIPTION OF THE PREFERRED EMBODIMENTS

Figure 1:
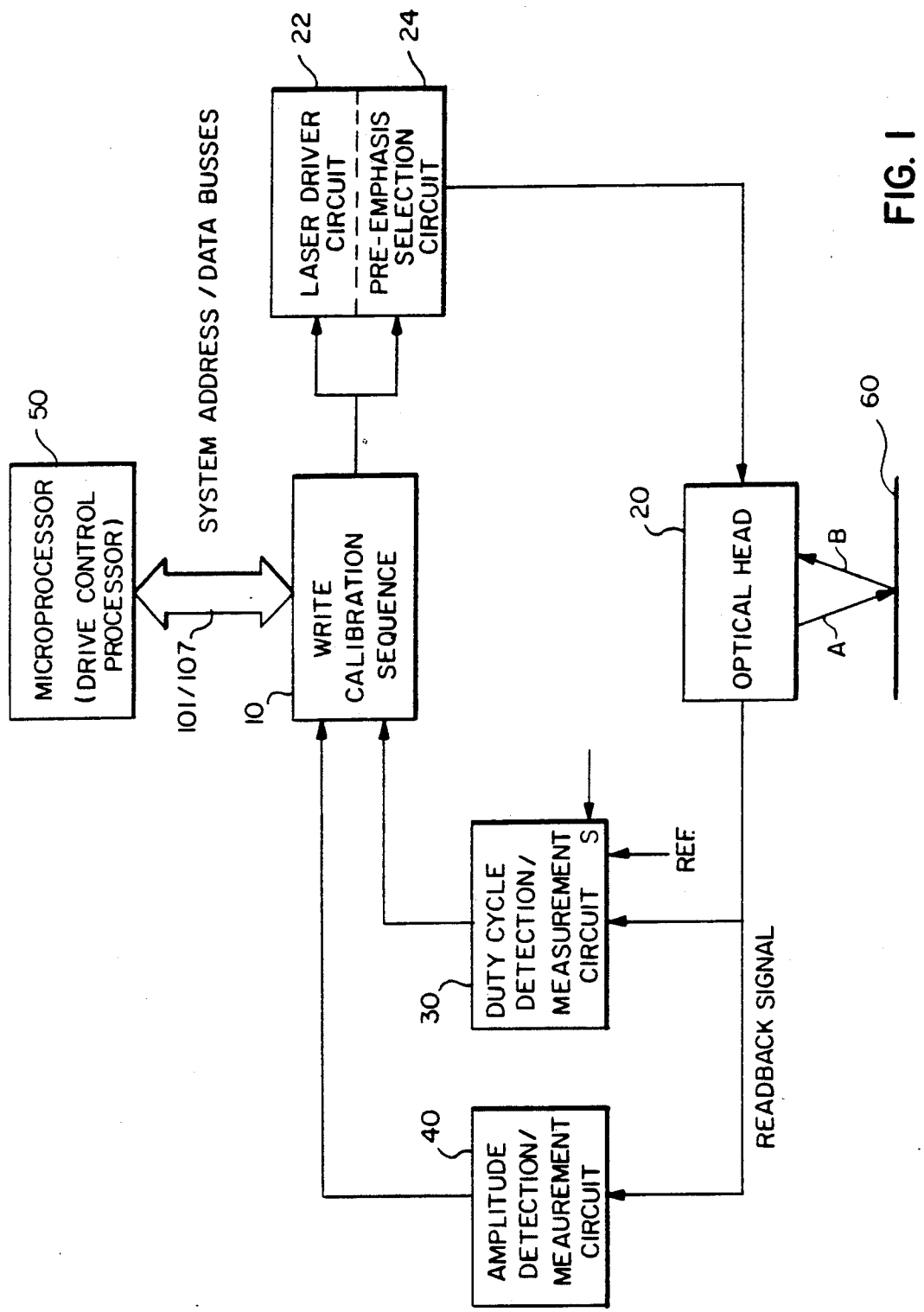
FIG. 1 illustrates in block schematic diagram form, a preferred embodiment of the invention.

Referring to FIG. 1, wherein the preferred apparatus embodiment is illustrated in block schematic form, the write power pre-emphasis selection circuit 24 and a laser driver circuit 22 provides a write power signal to an optical head 20 containing a laser. The laser performs a write function with a light beam A on an optical recording media (disk) 60. On a subsequent pass of the media, the optical head 20, by means of a read beam B, reads the pattern that was recorded by beam A and provides therefrom a read-back signal. The read-back signal is directed to an amplitude detection/measurement circuit 40 and to a duty cycle detection/measurement circuit 30. The duty cycle measurement circuit receives additional inputs, one is a reference level signal and the other is a multiplexer switching signal S. The outputs from the amplitude measurement circuit and the duty cycle measurement circuit, are directed to a write calibration sequencer 10. The write calibration sequencer 10 is connected to a micro-processor 50 by means of bi-directional address/data busses 101/107. The output of the micro-processor 50 is a controlled signal which is directed to the pre-emphasis selection circuit 24 and the laser driver circuit 22 to control the power of the laser beam generated by the optical head 20.

Figure 2:
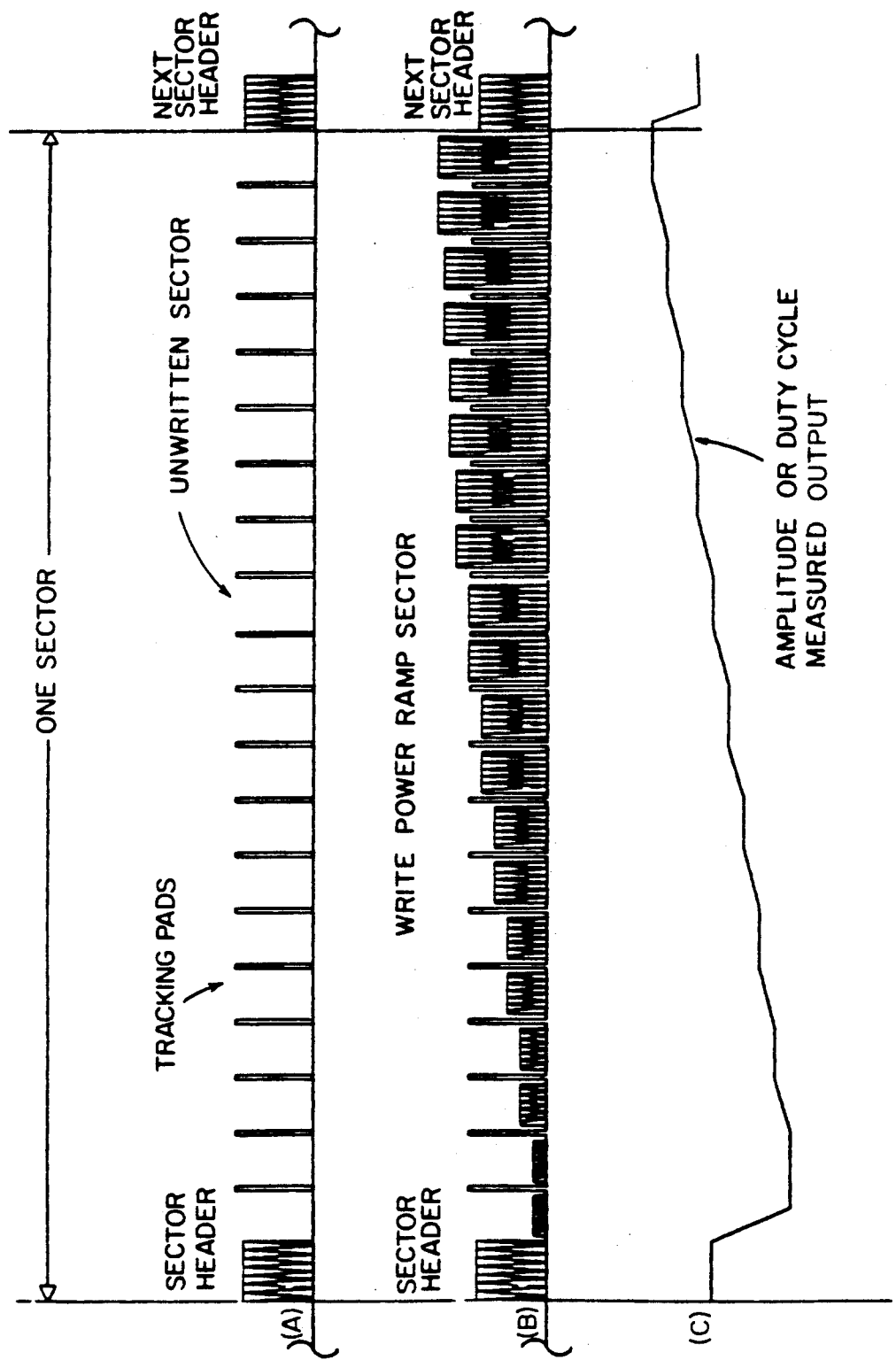
FIGS. 2(A), 2(B), and 2(C) illustrate a group of waveforms useful in understanding the operation of the present invention.

In FIG. 2(A), the signal illustrated is the read-back signal for one sector. In the illustrated format, there are tracking pads (long marks) at the mini-sector boundaries, these are not necessary for the write calibration system but existed in the product for which the invention was designed.

In FIG. 2(B), the signal illustrated is the read-back signal of a write power ramp sector. The drive written data (as opposed to the pre-formatted writing) found between the tracking pads is of larger amplitude in the later mini-sectors as a result of the higher write power used during recording.

In FIG. 2(C) the signal illustrated is the output of the amplitude detection/measurement circuit 40. This signal is proportional to the amplitude of the drive written data. This is the signal which is analog-to-digital converted and stored in a values memory to be described.

In the write calibration mode, the system operates to first cause a write power ramp sector to be recorded. This is a sector of a specific data pattern subdivided into 20 mini-sectors, each written at an incrementally higher power (FIG. 2(A)). On a subsequent pass, the optical head measures the amplitude of the read-back signal in each of the mini-sectors (FIG. 2(C)). A recording power level which results in the correct read-back amplitude signal, is then selected and recorded in the micro-processor 50. The next phase of the calibration procedure is to write a pre-emphasis ramp sector. This is a sector written with the power determined in the first phase and each mini-sector written at an incrementally higher pre-emphasis. Then on a subsequent pass, the drive measures the duty cycle of the read-back signal in each mini-sector of the pre-emphasis ramp sector. Thus, the system can select the pre-emphasis setting which yields the optimum duty cycle. This entire sequence takes place only when a disk is first used in a particular drive and thereafter, only as often as necessary to accommodate media aging effects. As previously stated under the "Background of the Invention", pre-emphasis is the delaying of all falling edges of the digital waveform by a constant time, resulting in all write pulses being lengthened and all spaces being shortened.

Figure 3:
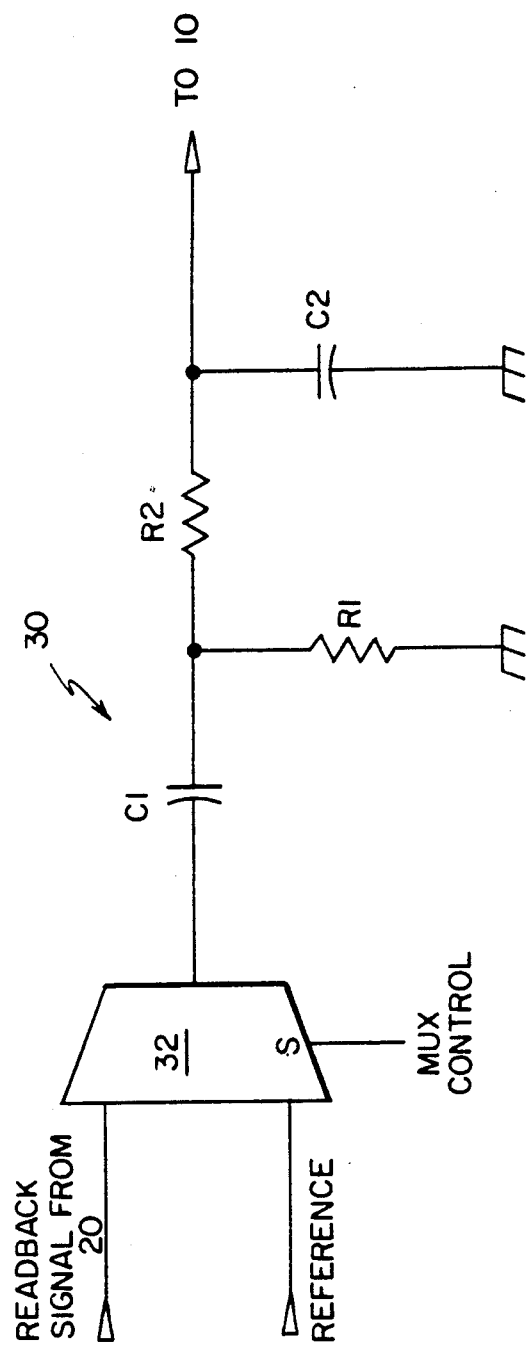
FIG. 3 is a detailed circuit diagram of block 30, illustrated in FIG. 1.

Referring to FIG. 3, wherein is illustrated the circuit diagram of the duty cycle measurement circuit 30. A multiplexer 32 receives at one input the read-back signal from the optical head 20 and at a second input a reference signal. The multiplexer 32 is controlled by a signal on the input labeled S to select which of the input signals will appear at its output. The circuit 30 is comprised of a $\pi$-type filter incorporating components R1, R2 and C2, having an input coupled to the output of the multiplexer 32 by a capacitor C1 and an output taken at the juncture of capacitor C2 and resistor R2. The output is directed to the input to the write calibration sequencer 10. In selection, a time constant T1 of R1, C1 should be substantially greater than a time constant T2 related to R2, C2. The circuit operates by comparing the DC content of the read-back signal to the DC content of a reference signal. This is accomplished by passing the reference signal through the multiplexer so that its DC content is established across C1. When a measurement is to be made, the multiplexer is switched to pass the read-back signal and the difference in DC content relative to the reference signal (voltage) accumulated on C2. This accumulated voltage is then sampled with an A to D converter 114 (see FIG. 4). The output of the circuit 30 can accurately indicate duty cycle variations of less than one percent, or sub-nano second at 2.5 megahertz to 10 megahertz frequencies.

Figure 4:
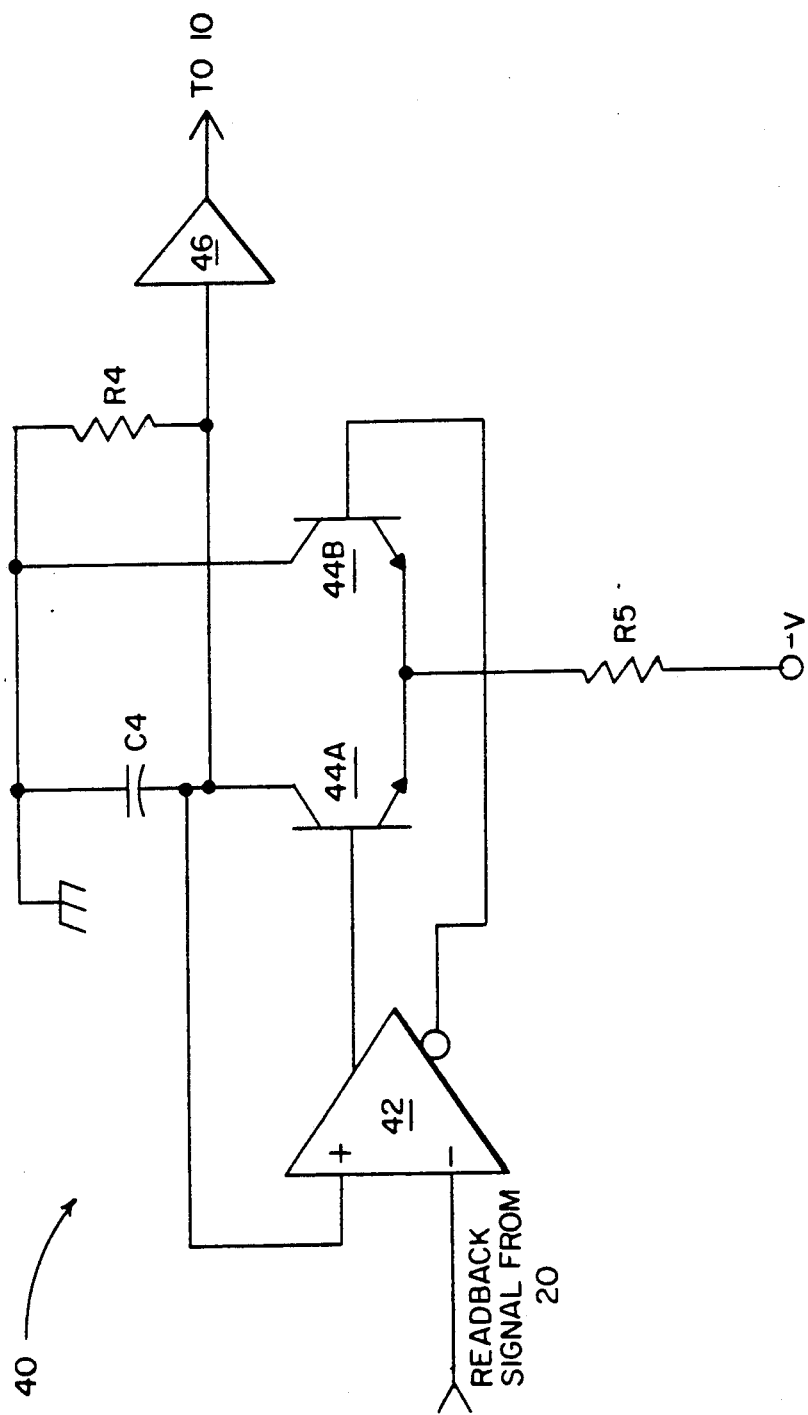
FIG. 4 is a detailed circuit diagram of block 40, illustrated in FIG. 1.

The amplitude/detection measurement circuit 40 is illustrated in FIG. 4. The circuit is comprised of an ECL comparator 42, a pair of NPN transistors 44A and 44B, a capacitor C4, resistors R4, R5, and a buffer amplifier 46. Capacitor C4 and resistor R4 are connected at one end to reference ground and resistor R5 is connected to a power source -V. Capacitor C4 functions as a holding capacitor which senses the voltage developed at the juncture of resistor R4 and the collector of transistor 44A. The juncture point is also the input to the buffer amplifier 46. The amplifier 46 amplifies the voltage on C4 and directs the amplified voltage to an input of the write calibration sequencer 10.

The voltage on the base of transistor 44B follows the level of the difference between the read-back signal, from the optical head 20, and the voltage on capacitor C4, causing a current to flow through R5. The voltage on capacitor C4 tends to follow the current flow through transistor 44A so as to assume a level of charge that is a function of the amplitude of the read-back signal.

Figure 5:
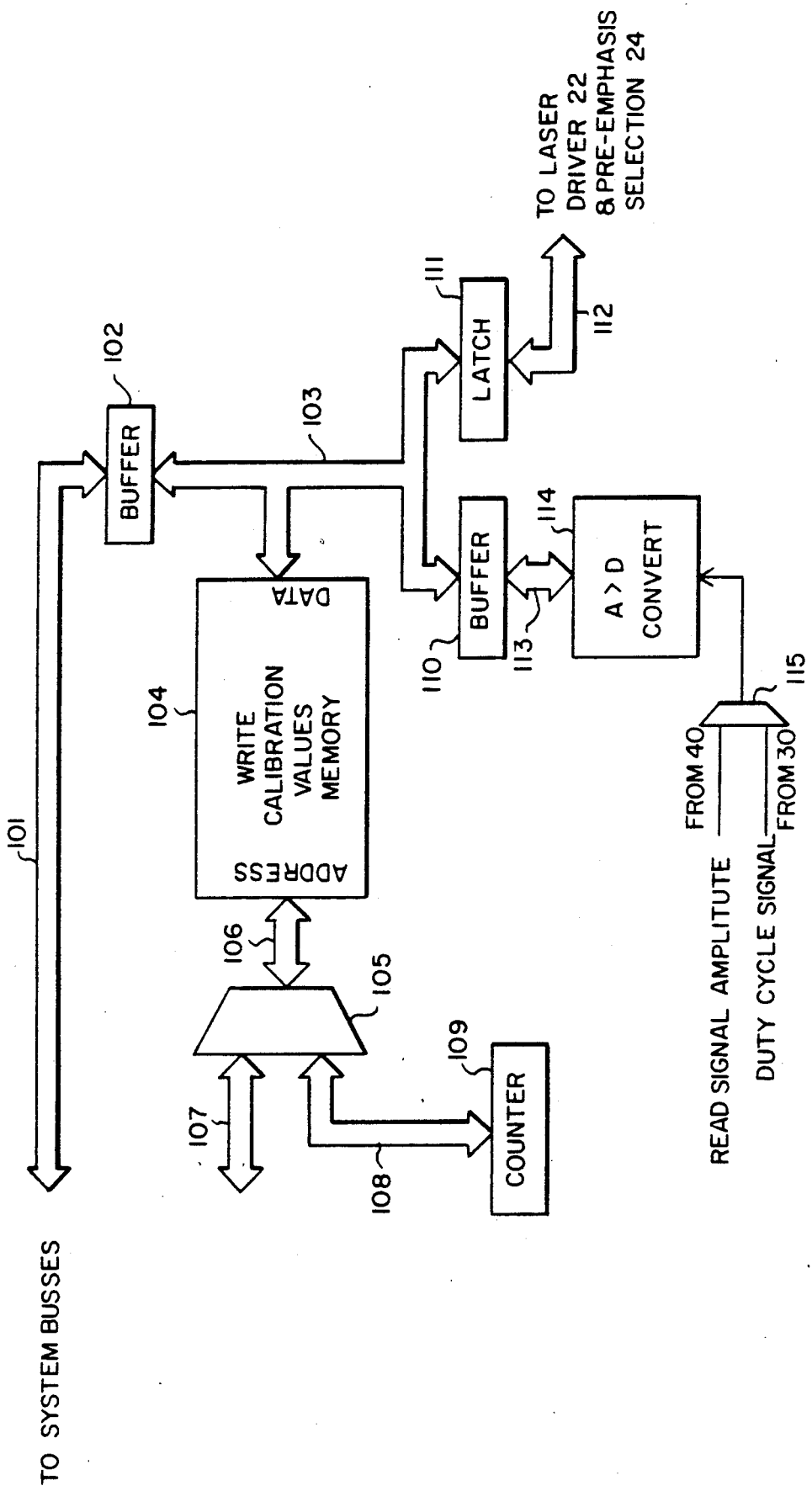
FIG. 5 is a detailed block diagram of block 10, illustrated in FIG. 1.

The Write Calibration Sequencer 10 (WCS), illustrated in FIG. 5, has two basic operating modes; write a calibration sector and measure a calibration sector. The function, in each mode, of the various blocks in FIG. 5 are described in the following paragraphs.

Write a calibration sector: The task of the WCS in this mode is to accept a list of values from the micro-processor 50, and subsequently pass them, one at a time, to either the laser driver circuit 22 (which controls write power) or to the pre-emphasis selection circuit 24 (which controls pre-emphasis), at the mini-sector boundaries of the target sector.

Data bus 101 and address bus 107 are connected to the micro-processor's address and data busses. These in combination with data buffer 102, data bus 103, address multiplexer 105, and address bus 106, provide access to a write calibration values memory 104, from the micro-processor. These blocks are used to transfer the list of values from the micro-processor to the write calibration values memory 104.

Before the target sector is read, the counter 109 is initialized to 0 and the address multiplexer 105 is set to pass the counter contents on to the values memory 104 address bus 106. Then, as each sub-division of the target sector is reached, the contents of the values memory (104) location, which is pointed to by the contents of the counter 109, is transferred via data bus 103 to the latch 111, and the counter 109 is incremented by one. The list of write calibration values is thereby transferred from the values memory 104 to the latch 111 at the proper times. Data bus 112 carries the WCS output data to both the laser driver circuit 22 and the pre-emphasis selection circuit 24.

Measure and calibration sector: The task of the WCS in this mode is to convert an analog signal to digital at the end of each mini-sector of the target sector and store the results in a values list, which the micro-processor 50 subsequently reads and interprets.

Before the target sector is reached, the counter 109 is initialized to zero and the address multiplexer 105 is set to pass the counter contents on to the values memory 104 address bus 106. Also, the analog multiplexer 115 is set to select either the read signal amplitude (for write power ramp measurement) or the duty cycle signal (for pre-emphasis ramp measurement).

Then each mini-sector of the target sector is reached, the output of the analog-to-digital converter 114 is transferred via data bus 113, buffer 110, and data bus 103 into the location of the values memory 104 currently pointed to by the contents of counter 109. After the analog-to-digital converter results are transferred to the values memory, a new analog-to-digital conversion cycle is started, and the counter 109 is incremented by one to point to the next values location.

After the target sector has passed and all conversions are stored in the values memory, the micro-processor sets multiplexer 105 to select address bus 107, and once again has access to the values memory. Then it can extract the values via data bus 101, buffer 102, and data bus 103 and interpret them.

The procedural pseudo-code used in the preferred embodiment of the invention is set forth below.

Procedural Pseudo-Code Write Calibration Procedure Outline

Amplitude (write power) Calibrate:
  Repeat
    Select a target sector for the write power calibration
    Measure the amplitude of the format in the target sector
    Write with a "Power Ramp" in the target sector
    Measure the amplitude in each mini-sector of the target
    Calculate the amplitude match ratio at each mini-sector by: Ramp amplitude/format amplitude
    Select the write power which yields the optimum amplitude match (closest to 1)
  Until (3 iterations)
  Average the 3 selected write powers.
  Verify that all three write powers agree within a tolerance of the calculated mean write power.

Pre-emphasis (Duty Cycle) Calibrate:
  Repeat
    Select a target sector for the pre-emphasis calibration
    Write a "Pre-emphasis Ramp" in the target sector
    Measure the Duty Cycle in each mini-sector of the target
    Select the pre-emphasis which yields the optimum duty cycle (closest to 50%)
  Until (3 iterations)
  Average the 3 selected pre-emphasis.
  Verify that all three pre-emphasis agree within a tolerance of the calculated mean pre-emphasis.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

What is claimed is:

1. A method for calibrating the writing power applied to an optical recording media by a write laser comprising the steps of:

writing at different positions on said optical recording media with a write signal having a different power level for each position;

reading out the level of the write signal at each different position to form read-out signals;

comparing the level of each different read-out signal against a known standard read-out signal; and selecting the write power level that yielded the read-out signal closest to the standard read-out signal for thereafter recording data on said optical recording media.

2. A method for calibrating the writing power applied to an optical recording media by a write laser comprising the steps of:

formatting said optical recording media by writing on said optical recording media with a laser at a power level that causes a read-out of a pre-selected amplitude to form a reference amplitude signal;

before writing data on to said optical recording media, writing at different positions on said optical recording media with a write signal having a different power level for each position;

reading out each different level of the writing on said optical recording media to form amplitude signals;

comparing the amplitude of each of the read-out signals against the reference amplitude signal; and selecting the write power level that caused the amplitude signal that is closest to the reference amplitude signal for writing data on said optical media.

3. The method according to claim 2 and further comprising the steps of:

writing a pre-emphasis ramp sector on said optical recording media at the selected power level; and reading out the writing and selecting as the pre-emphasis that level of the ramp sector which causes the desired duty cycle in the read-out.

4. The method according to claim 3 wherein the desired duty cycle is 50%.

5. The method according to claim 4 wherein each step is repeated a number of times and the output is averaged to arrive at the desired write power level and the pre-emphasis level.

6. An apparatus for calibrating the writing power applied to an optical recording media comprising:

means for writing at different positions on said optical recording media with a write signal having a different power level for each position;

means for reading out the level of the write signal at each different position to form read-out signals;

means for comparing the level of each different read-out signal against a known standard read-out signal; and means for selecting the write power level that yielded the read-out signal closest to the standard read-out signal for thereafter recording data on said optical recording media.

7. The apparatus according to claim 6 wherein said means for reading out is an amplitude detection circuit for detecting the amplitude of the read-out signal.

8. The apparatus according to claim 6 wherein said means for comparing is comprised of:

an analog-to-digital converter means for receiving said read-out signals and for converting said signals to digital signals;

a write calibration memory means for writing and storing each of the read-out signals; and processor means coupled to said write calibration memory means for determining the closest match of the read-out signals to the reference read-out signal and for controllably directing the determined read-out signal to said means for writing.

9. The apparatus according to claim 8 wherein said write calibration memory means further comprises means for storing a pre-emphasis signal;

and said apparatus further comprises:

pre-emphasis selection means for receiving the pre-emphasis signal from said write calibration memory means;

a duty cycle measurement means for measuring the duty cycle of the pre-emphasis signal read from said optical recording media; and means for adjusting the pre-emphasis signal to have a desired duty cycle.

10. The apparatus according to claim 9 wherein said duty cycle measurement means is comprised of:

a multiplexer means having a first input for receiving read-out signals and a second input for receiving a reference signal and a third input for receiving a switching signal for switching the first and the second input to an output;

a $\pi$ filter having an input and an output with said output connected to an input of said write calibration sequencer means; and a capacitor connecting the output of said multiplexer means to the input to said $\pi$ filter.

* * * * *